Figure 1:
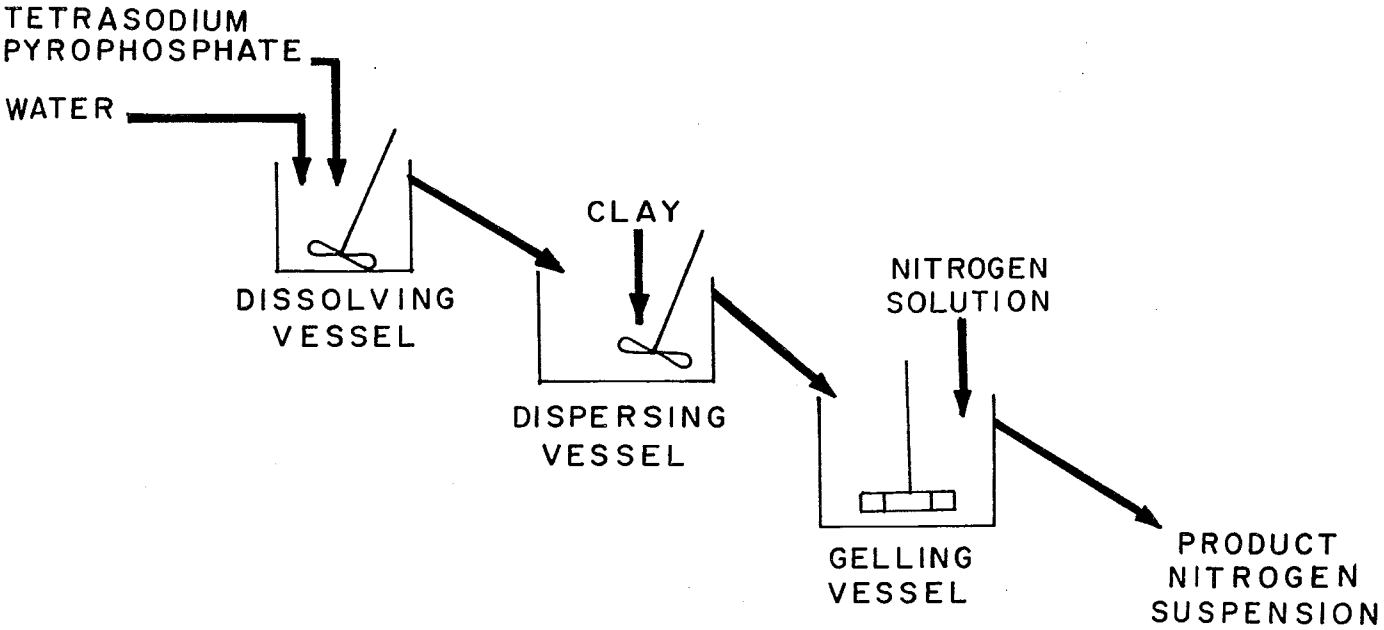
Figure 2:
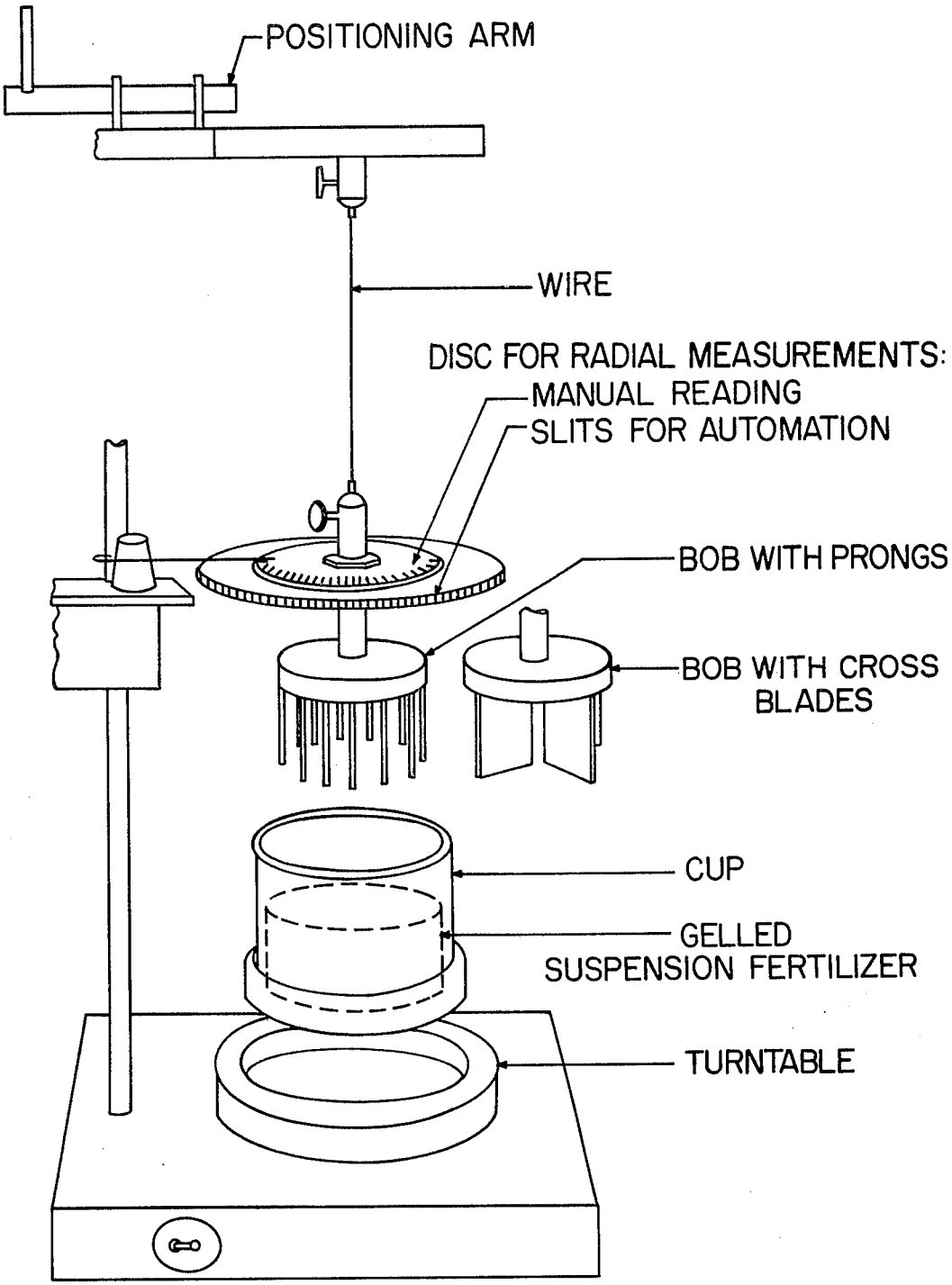

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 9

T940,614

NITROGEN SUSPENSION

David E. Nichols, 1406 Fordsway, Muscle Shoals, Ala. 35660, and Edgar W. Sawyer, Jr., 209 Gaywood Drive, Hagerstown, Md. 25411

Filed Sept. 25, 1974, Ser. No. 509,280

**Int. Cl. C05b *15/00***

U.S. Cl. 71—29

2 Sheets Drawing. 11 Pages Specification

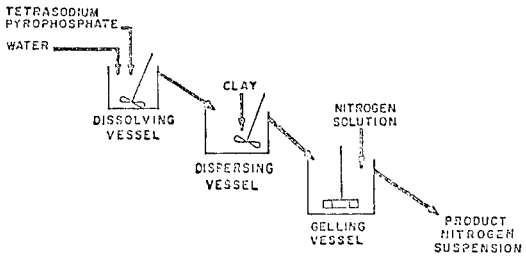

A process for the production of an improved nitrogen fertilizer suspension by dispersing attapulgite clay and water with a dispersing agent and adding the dispersed clay to the nitrogen solution to cause the clay to gel. The concentration of clay in the dispersed state can be as high as 30 percent, and with a concentration of clay in the gel state (i.e., nitrogen solution) of 2 percent, high gel strength can be obtained with only moderate agitation. The products are useful in making mixed high-nitrogen suspensions that also contain phosphorus and potassium by simply blending the base nitrogen suspension with phosphate base suspension and solid potassium chloride.

METHOD FOR DISPERSING AND GELLING CLAY FOR PRODUCTION OF NITROGEN FERTILIZER SUSPENSION

GELOMETER